United States Patent Office 3,796,735
Patented Mar. 12, 1974

3,796,735
ESTERS BY THERMAL CLEAVAGE AND REACTION OF ALPHA-NITROKETONES WITH ALCOHOLS
Roger G. Duranleau, Ardonia, Mahmoud S. Kablaoui, Wappingers Falls, and Richard F. Love, Fishkill, N.Y., assignors to Texaco Inc., New York, N.Y.
No Drawing. Filed Dec. 8, 1971, Ser. No. 206,151
Int. Cl. C07c 69/24, 69/76
U.S. Cl. 260—410.6                   21 Claims

ABSTRACT OF THE DISCLOSURE

A method for preparing esters, and as a valuable co-product nitroalkanes, by thermally cleaving and reacting an alpha-nitroketone with an alcohol in a non-aqueous environment at a temperature of from about 110° C. to about 190° C. The esters so prepared are useful as synthetic lubricants, cutting fluids, plasticizers, cosmetic additives and surfactant additives.

BACKGROUND OF THE INVENTION

This invention relates to a novel method of preparing esters from alpha-nitroketones. In particular, it relates to a method for preparing esters by simultaneously thermally cleaving and esterifying alpha-nitroketones to produce the corresponding ester and as a co-product a nitroalkane.

Heretofore, the cleavage and esterification of alpha-nitroketones with alcohols was undertaken catalytically employing as catalyst such materials as alkali and alkaline earth oxides, alkoxides and hydroxides or organic amines. A serious disadvantage in such a process resided in the interaction between the catalyst and nitroalkane by-product. In the instance where nitromethane is a product, separation of the products and catalyst by means of distillation is not feasible in view of the existing threat of explosion from a violet reaction between this nitroalkane and catalyst. A method has now been found whereby esters of alpha-nitroketones can be produced and the products safely recovered in high yields in the absence of an added catalytic agent.

SUMMARY OF THE INVENTION

Broadly, this invention contemplates a method for the preparation of esters which comprises:

(a) thermally cleaving and reacting an alpha nitroketone with an alcohol at a temperature of from about 110° C. to about 190° C., preferably about 150° C. to 190° C., in a non-aqueous environment.
(b) separating a nitroalkane and alcohol from said product of (a), and
(c) recovering said ester.

According to our invention the alpha-nitroketones thermally cleaved and esterified in the instant invention correspond to the formula:

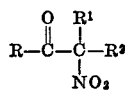

where R is an alkyl group having from 1 to 20 carbon atoms or an aryl group of from 6 to 20 carbon atoms and where $R^1$ and $R^2$ are hydrogen, alkyl groups of from 1 to 20 carbon atoms or aryl groups of from 6 to 20 carbon atoms. Combination of groups may be present as for example R can be alkyl and $R^1$ and $R^2$ hydrogen, or R and $R^1$ may be aryl and $R^2$ hydrogen, or R may be alkyl, $R^1$ hydrogen and $R^2$ aryl. Illustrative of the alpha-nitroketones contemplated herein we mention 1-nitro-2-butanone, 3-nitro-2-butanone, 3-methyl-3-nitrobutanone, 2-nitro-3-pentanone, 3-nitro-2-pentanone, 1-nitro-2-hexanone, 3-nitro-2-hexanone, 4-nitro-3-hexanone, 3-nitro-4-heptanone, 4-nitro-3-heptanone, 5-nitro-4-octanone, 1-nitro-1-phenylpropanone, 3-nitro-1-phenylpropanone, 4-nitro-5-decanone, 5-nitro-4-dodecanone, 4-nitro-5-dodecanone, alpha-nitrobenzylphenylketone, 1,4-diphenyl-3-nitro-2-butanone, 8-nitro-9-heptadecanone, 9-nitro-8-heptadecanone, 1-nitro-2-octadecanone, 1-nitro-2-nonadecanone, 5-nitro-6-eicosanone and 1-nitro-2-heneicosanone.

Alcohols contemplated herein correspond to the formula $R^3OH$ and are limited to primary and secondary alcohols. Tertiary alcohols have not been found to be reactive in the instant thermal method. Thus, in the formula above $R^3$ can be an alkyl group of from 1 to 20 carbon atoms such as methyl, ethyl propyl, butyl, hexyl, octyl, decyl, dodecyl or hexadecyl. Dihydroxy and polyhydroxy primary and secondary alcohols are also intended to be understood as operative in the instant process. Illustrative of the alcohols contemplated herein we mention methanol, ethanol, isopropanol, n-butanol, 2-hexanol, cyclohexanol, 2-octanol, 2-decanol, 1-dodecanol, 1-hexadecanol, ethylene glycol, propylene glycol and pentaerythritol. Mixtures of alcohols such as $C_{10}$ to $C_{13}$ alcohols are contemplated including isomeric mixtures containing primary and secondary alcohols. At least 1 mole and up to 100 moles of alcohol per mole of alphanitroketone are employed and preferably from 5 to 25 moles of alcohol per mole of alpha-nitroketone are present during the course of the reaction. Most importantly the reaction must be conducted in a non-aqueous environment, that is, in the substantial absence of water. The thermal cleavage and reaction is sensitive to water and water in amounts exceeding 0.1 weight percent based on the weight of alcohol employed cause competing reactions to occur leading to the formation of acids instead of the desired esters. Excessive amounts of alcohol can be employed serving as solvent for the reaction or alternatively an inert reaction solvent may be employed such as n-hexane, n-heptane, xylene, ethylbenzene, dichlorobenzene, methylnaphthalene, dioxane and tertiary alcohols.

The simultaneous cleavage and esterification is conducted thermally, that is, in the absence of catalytic agents at temperatures of from about 110° C. to 190° C., preferably from about 150° C. to 190° C. In practice, reactions below 110° C. are excessively slow and temperatures exceeding 190° C. are deleterious in that thermal decomposition of the nitroketone to acids and other products occurs rather than the desired cleavage. The reaction time can vary from one-half to twenty hours. Pressures of from 0 to 500 p.s.i.g. may be employed. In general, if the alcohol employed boils above the selected operating temperature no pressure is necessary. When the alcohol possesses a boiling point below that of the temperature selected, the reaction can be conducted at autogenous pressure.

The esters prepared according to this invention correspond to the formula:

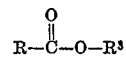

where R and $R^3$ are groups as heretofore defined. Specific examples of esters prepared by the instant thermal method include by way of example methyl acetate, ethyl acetate, methyl propanoate, methyl butyrate, 2-hexyl butyrate, isopropyl pentanoate, 2-octyl heptanoate, n-butyl nonanoate, ethyl phenylacetate, and methyl benzoate. Such esters are useful as lubricants, cutting fluids, plasticizers, cosmetic additives and surfactant additives. Further, they can be utilized as intermediates in the preparation of fatty acids, amides, acid chlorides and alcohols.

The thermal reaction outlined above involving cleavage and esterification of an alpha-nitroketone additionally forms as a co-product a nitroalkane corresponding to the formula:

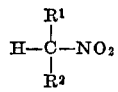

where $R^1$ and $R^2$ are groups as heretofore described including by way of example nitromethane, nitroethane, 1-nitrobutane, 1-nitrooctane and 1-nitro-2-phenylethane.

At completion of the thermal cleavage and esterification reaction, the product comprises a mixture of alcohol, solvent if employed, nitroalkane and the ester. The nitroketone is essentially completely converted in the subject reaction. To recover the ester, the reaction mixture containing the ester and nitroalkane is distilled so as to separate excess alcohol, nitroalkane and solvent, when present, from the ester. In place of distillation, the nitroalkane, alcohol and solvent can be separated by evaporation under vacuum. Very high purities of ester can be obtained by vacuum distillation.

Separation and recovery of nitroalkanes in the overhead or condensate from alcohols having different boiling points is easily accomplished by distillation. Where the nitroalkane and alcohol have similar boiling points or form an azeotropic mixture, the overhead is separated by absorption of the nitroalkane in a suitable column containing for example silica gel, activated charcoal or a basic ion exchange resin.

In order to more fully illustrate the nature of our invention and manner of practicing the same the following examples are presented.

EXAMPLE I

A cylindrical pressure reactor was equipped with a pressure gauge, thermometer, heating mantle and magnetic stirrer. The reactor was charged with 12.0 grams (0.042 mole) of 1-nitro-2-hexadecanone and 350 milliliters (8.7 moles) of absolute methanol. The reaction was conducted at a temperature of 148 to 150° C. and a pressure of 200 to 210 p.s.i.g. for 105 minutes. Analysis by gas chromatography of a 25 milliliter aliquot identified nitromethane (90 percent yield). After venting the reactor and cooling, a 300 milliliter aliquot was evaporated at a reduced pressure of 15 mm./Hg at a temperature of 60° C. to remove the excess alcohol and the nitromethane. The oily residue weighed 9.3 grams (approximately 97 percent yield) and was identified by infrared analysis to be methyl pentadecanoate.

EXAMPLE II

To the reactor employed in Example I there was charged 350 milliliters of isopropanol (4.57 moles, 0.04 percent water) and 12.0 grams (0.042 mole) of 1-nitro-2-hexadecanone and the charge was heated to a temperature of 170–175° C. under a pressure of 190 to 220 p.s.i.g. for 200 minutes. After cooling the reaction products and removing the unreacted isopropanol and nitromethane by evaporation under a reduced pressure of 15 mm./Hg, the residue (11.74 grams, 98.5 percent yield) was identified by infrared analysis to be isopropyl pentadecanoate.

EXAMPLE III

The procedure of Example I was followed employing 350 milliliters (6.1 moles) of absolute ethanol containing less than 0.001 percent water and 24.0 grams (0.084 mole) of 1-nitro-2-hexadecanone. The conversion was conducted at a temperature of 168–169° C. and 193 to 207 p.s.i.g. for 160 minutes. Thereafter, the product was cooled and excess ethanol and nitromethane were removed by evaporation at a reduced pressure of 15 mm./Hg. The residue, 22.14 grams, corresponding to a yield of 98.5 percent was identified by infrared analysis to be ethyl pentadecanoate.

EXAMPLE IV

The procedure of Example I was followed except 350 milliliters (5.8 moles) of 95 percent ethanol containing 5 percent water was employed as the reactant along with 12.0 grams (0.042 mole) of 1-nitro-2-hexadecanone. The reactor was heated at a temperature ranging from 148–163° C. and a pressure of 190 to 207 p.s.i.g. for 5 hours, whereupon the product was cooled and excess ethanol and nitromethane were removed by evaporation at reduced pressure of 15 mm./Hg. There was recovered 10.11 grams of product which was identified by infrared spectral analysis to be a mixture of pentadecanoic acid and ethyl pentadecanoate in the ratio of 1 to 4.

EXAMPLE V

In the manner of the preceding examples, 340 milliliters of n-butyl alcohol (3.72 moles, 0.01 percent water) and 12.0 grams (0.042 mole) of 1-nitro-2-hexadecanone were reacted at a temperature of 159–175° C. under a pressure of 70 to 75 p.s.i.g. for 120 minutes. A 310 milliliter aliquot of product was subjected to a reduced pressure of 15 mm./Hg at 90° C. to remove n-butyl alcohol, and there was recovered a residue weighing 12.45 grams identified by its infrared spectrum to be entirely n-butyl pentadecanoate (99 percent yield).

EXAMPLE VI

The procedure of Example V was repeated except 340 milliliters (3.63 moles) of tertiary butyl alcohol (less than 0.01 percent water) were employed along with 12.0 grams (0.042 mole) of 1-nitro-2-hexadecanone. The reactor was heated at increasing temperatures ranging from 153 to 184° C. and a pressure of 207 to 233 p.s.i.g. for 3.5 hours. Infrared analysis indicated no conversion of ketone and no ester formation was detected. Further heating for two hours at 190° C. gave the same results.

EXAMPLE VII

To a 100 milliliter flask there was added 5.71 grams (0.042 mole) of pentaerythritol (less than 0.1 percent water) and 48.0 grams (0.168 mole) of 1-nitro-2-hexadecanone and heated to 185–192° C. at atmospheric pressure for 3 hours. A 4.2 gram portion of the reaction product was recovered by condensation and identified by infrared analysis to be entirely nitromethane. The residue (47.6 grams) was collected and identified by infrared analysis to contain about 36 grams of pentaerythritol tripentadecanoate and about 11.7 grams of unreacted nitroketone. The pentaerythritol was completely reacted.

EXAMPLE VIII

A 2.0 gram (0.0066 mole) mixture of 9-nitro-8-heptadecanone and 8-nitro-9-heptadecanone along with 100 milliliters (2.5 moles) of absolute methanol were charged to the reactor described in Example I and heated to 150° C. at 165 to 189 p.s.i.g. for 180 minutes. After cooling, the product was subjected to a reduced pressure of 15 mm./Hg at 60° C. thereby removing the excess methanol. The residue (1.96 grams) comprised a mixture of 1-nitrooctane, 1-nitrononane, methyl octanoate and methyl nonanoate as identified by infrared and nuclear magnetic resonance analyses. On the basis of the analyses it was estimated that the yield of esters was 90 percent.

EXAMPLE IX

To a 200 milliliter flask containing 5.7 grams (0.020 mole) of 1-nitro-2-hexadecanone and 100 milliliters xylene there was added 4.85 grams (0.02 mole) of 1-hexadecanol (less than 0.1 percent water). The contents of the flask were refluxed for eight days at atmospheric pressure and there was added periodically small amounts of xylene. At the end of eight days xylene and nitromethane were removed from the product by evaporation under a reduced pressure of 15 mm./Hg and the residue (8.45 grams), corresponding to a yield of 87 percent, was shown by infrared analysis to be hexadecyl pentadecanoate.

We claim:

1. A method for the preparation of esters which comprises (a) thermally cleaving and reacting an alpha-nitroketone corresponding to the formula:

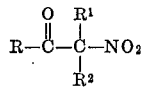

where R is an alkyl group of from 1 to 20 carbon atoms, or an aryl group of from 6 to 20 carbon atoms, and where $R^1$ and $R^2$ are hydrogen, alkyl groups of from 1 to 20 carbon atoms or aryl groups of from 6 to 20 carbon atoms, with an alcohol at a temperature of from about 150° C. to about 190 C. in a non-aqueous environment, where water is present in an amount not exceeding 0.1 weight percent based on the weight of the alcohol employed, (b) separating a nitroalkane and alcohol from said product of (a), and (c) recovering said ester.

2. A method according to claim 1 wherein said alcohol is a primary or secondary alcohol corresponding to the formula $R^3OH$ where $R^3$ is an alkyl group of from 1 to 20 carbon atoms.

3. A method according to claim 1 wherein step (a) is conducted at a pressure of from 0 to 500 p.s.i.g.

4. A method according to claim 1 wherein said nitroketone is 1-nitro-2-hexanone.

5. A method according to claim 1 wherein said nitroketone is 5-nitro-4-octanone.

6. A method according to claim 1 wherein said nitroketone is 1-nitro-2-hexadecanone.

7. A method according to claim 1 wherein said nitroketone is 8-nitro-7-heptadecanone.

8. A method according to claim 1 wherein said alcohol is methanol.

9. A method according to claim 1 wherein said alcohol is ethanol.

10. A method according to claim 1 wherein said alcohol is isopropanol.

11. A method according to claim 1 wherein said alcohol is ethylene glycol.

12. A method according to claim 1 wherein said alcohol is pentaerythritol.

13. A method according to claim 1 wherein said ester is methyl pentadecanoate.

14. A method according to claim 1 wherein said ester is ethyl pentadecanoate.

15. A method according to claim 1 wherein said ester is isopropyl pentadecanoate.

16. A method according to claim 1 wherein said ester is hexadecyl pentadecanoate.

17. A method according to claim 1 wherein said ester is pentaerythritol tripentadecanoate.

18. A method accordnig to claim 1 wherein said nitroalkane and alcohol are separated in (b) by distillation.

19. A method according to claim 1 wherein said nitroalkane and alcohol are separated in (b) by evaporation under vacuum.

20. A method according to claim 1 wherein said nitroalkane is separated from the product of (b) distillation.

21. A method according to claim 1 wherein said nitroalkane is separated from the product of (b) by absorption.

References Cited
UNITED STATES PATENTS
3,551,465 12/1970 Ellis _____ 260—410.9

LEWIS GOTTS, Primary Examiner
D. G. RIVERS, Assistant Examiner

U.S. Cl. X.R.
260—410.9 R, 410, 476 R, 488 F, 488 J